United States Patent [19]
Beakes et al.

[11] Patent Number: 6,108,897
[45] Date of Patent: Aug. 29, 2000

[54] STATOR COIL FINISH LEAD POSITIONING

[75] Inventors: John M. Beakes, Fairborn; Nathan A. Buckner, Huber Heights, both of Ohio

[73] Assignee: Globe Products Inc., Huber Heights, Ohio

[21] Appl. No.: 09/156,916

[22] Filed: Sep. 18, 1998

Related U.S. Application Data

[60] Provisional application No. 60/059,221, Sep. 18, 1997.

[51] Int. Cl.[7] .................................................. H02K 15/095
[52] U.S. Cl. ........................ 29/596; 242/432.4; 242/432.6
[58] Field of Search .............................. 29/596, 732, 605; 242/432.2, 432.3, 432.4, 432.5, 432.6

[56] References Cited

U.S. PATENT DOCUMENTS

| | | |
|---|---|---|
| 4,000,764 | 1/1977 | Reiger, Jr. . |
| 4,074,418 | 2/1978 | Pearsall ..................................... 29/596 |
| 4,281,450 | 8/1981 | Bale ......................................... 29/596 |
| 5,186,405 | 2/1993 | Beakes et al. . |
| 5,214,838 | 6/1993 | Beakes et al. . |
| 5,370,324 | 12/1994 | Beakes et al. . |
| 5,549,253 | 8/1996 | Beakes et al. . |
| 5,586,384 | 12/1996 | Newman . |
| 5,784,771 | 7/1998 | Beakes et al. . |
| 5,794,884 | 8/1998 | Doglas et al. ........................ 242/433.3 |
| 5,833,166 | 11/1998 | Newman . |

*Primary Examiner*—Carl E. Hall
*Attorney, Agent, or Firm*—Roger S. Dybvig

[57] ABSTRACT

A stator coil finish wire is wedged between the wound coil from which it extends and the stator core at a stator winding station. To accomplish this, a loop is formed in the finish lead and trapped between cooperating surfaces to frictionally resist the wire loop being pulled out by the wire gripper of a lead pull assembly. The wire gripper moves in directions to remove the loop and to wedge the stretch of the lead wire extending through the stator core between the coil and the core. This procedure is advantageously used when winding stators which do not have terminal boards.

3 Claims, 3 Drawing Sheets

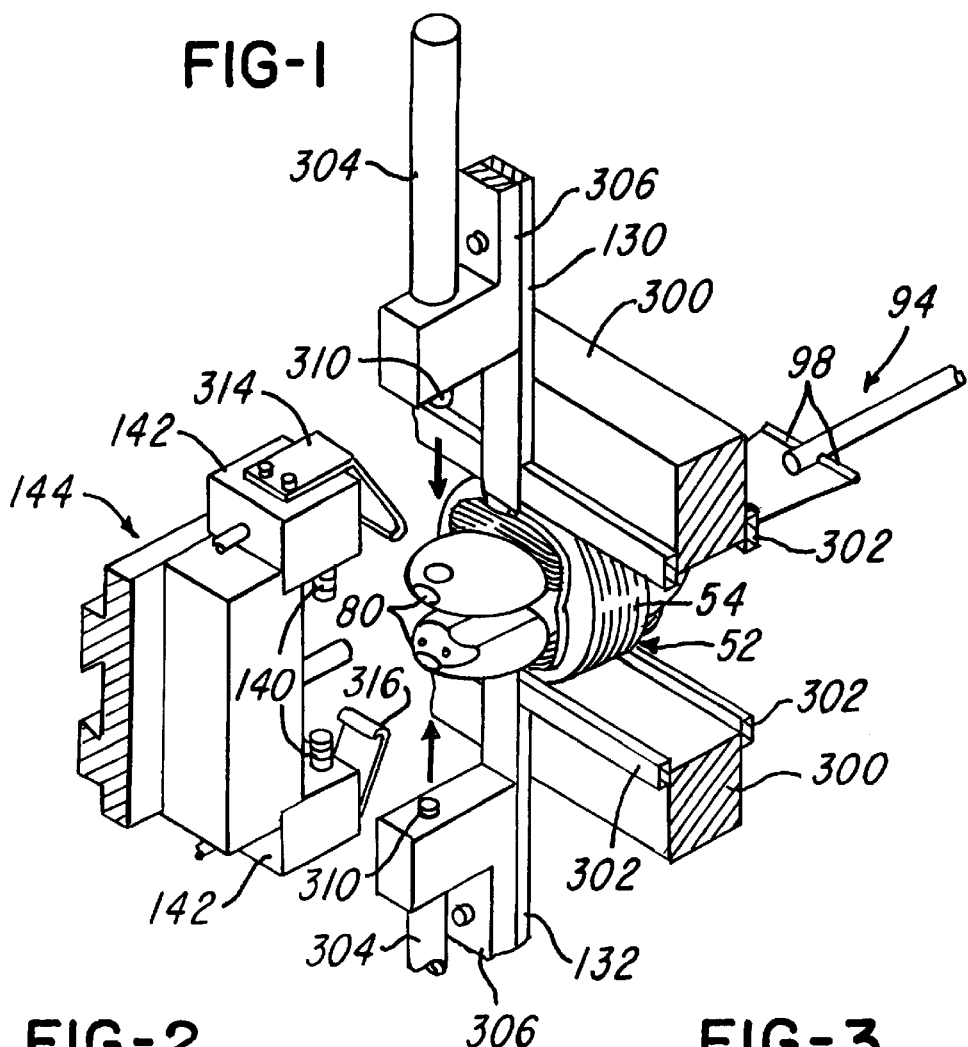
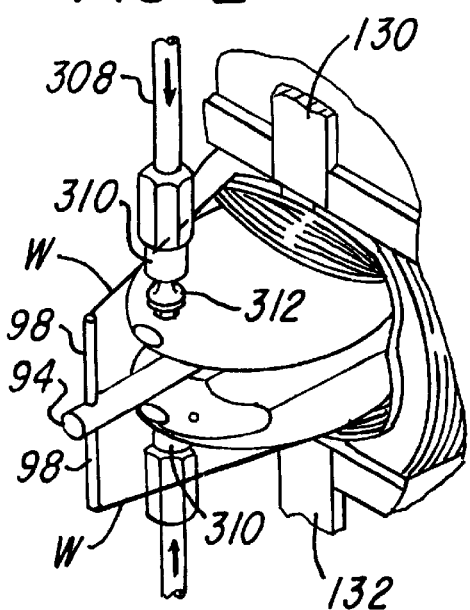
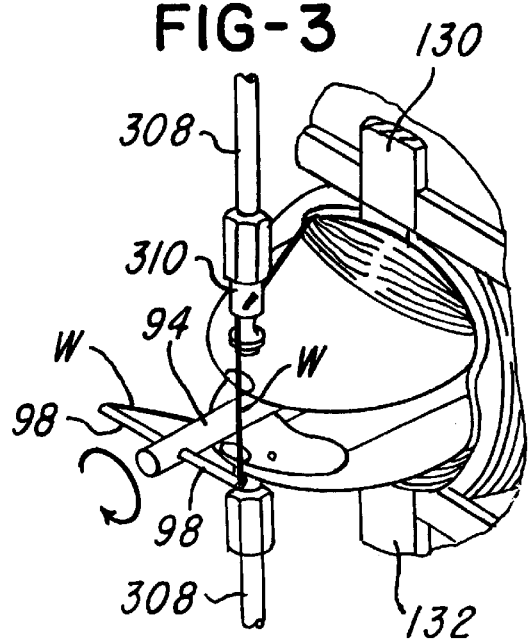

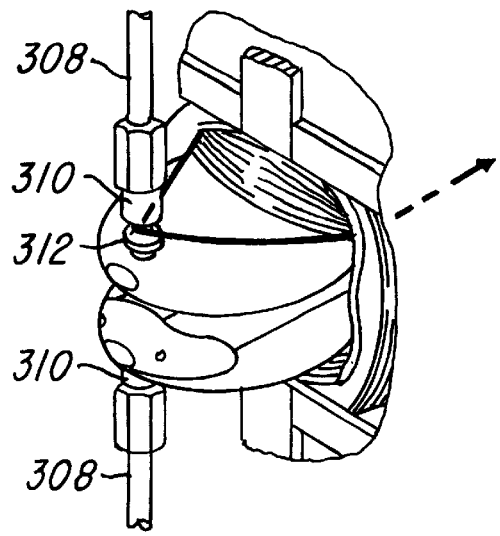
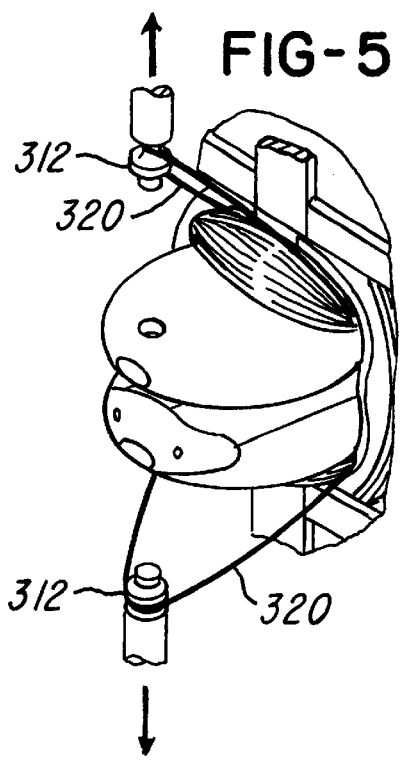
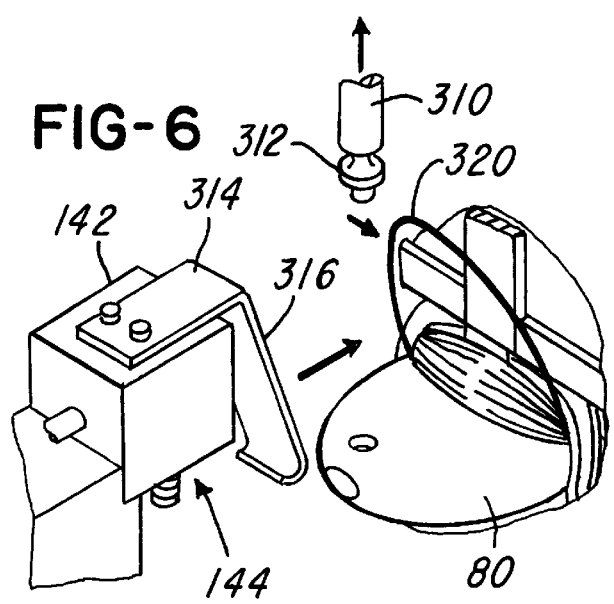
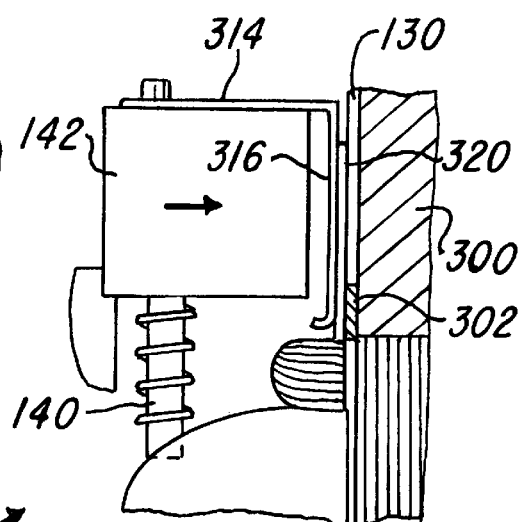
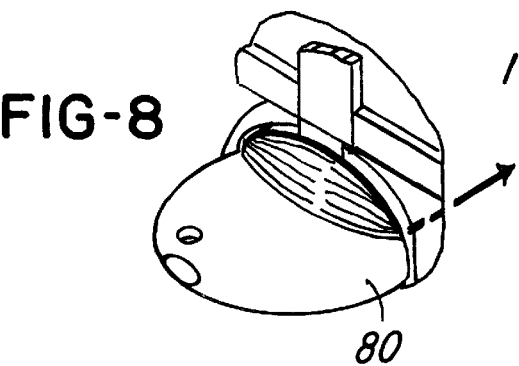

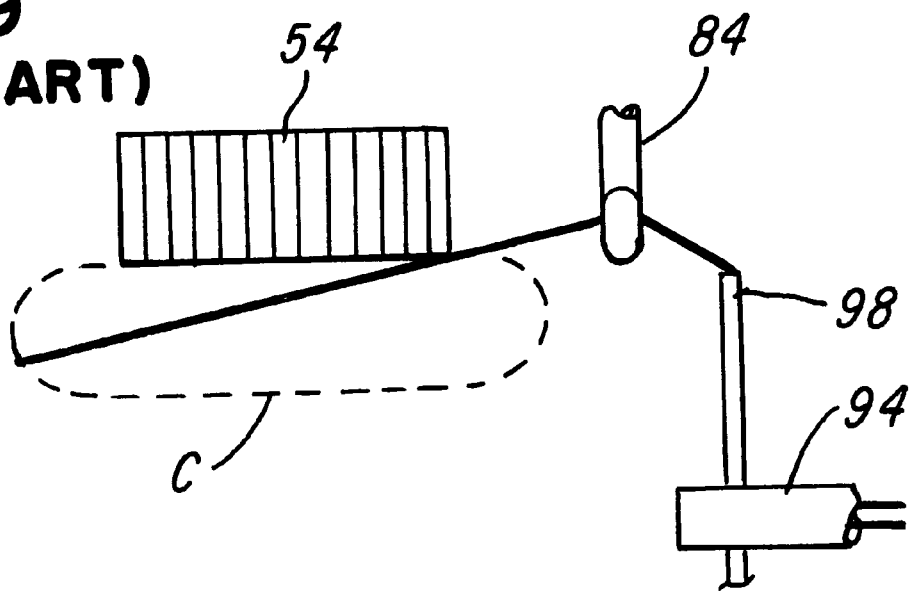
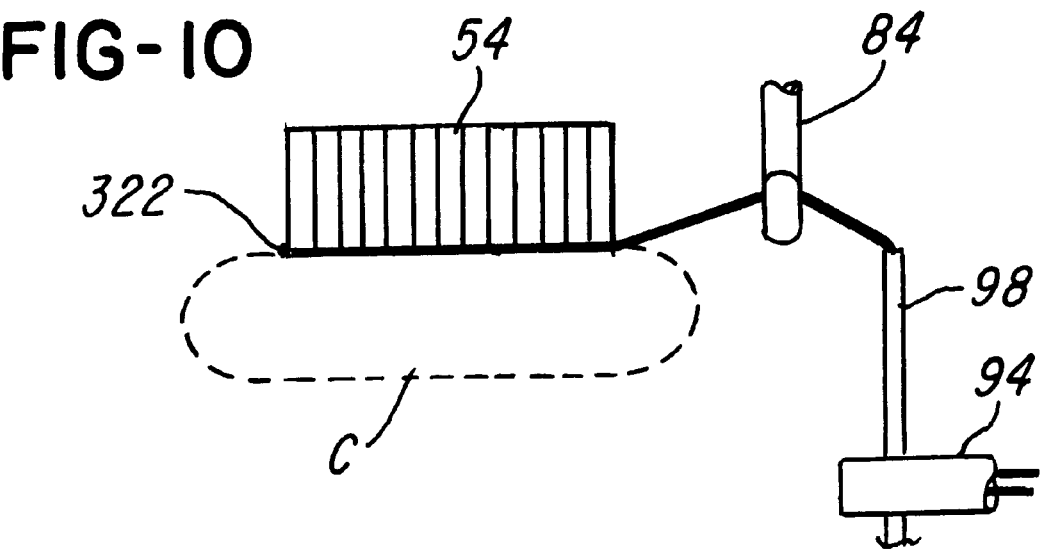

STATOR COIL FINISH LEAD POSITIONING

CROSS-REFERENCE TO RELATED APPLICATIONS

This application claims the benefit of copending U.S. Provisional Patent Application, Ser. No. 60/059,221, filed Sep. 18, 1997.

FIELD OF THE INVENTION

This invention relates to a method and an apparatus for manufacturing electric motor stators. More particularly, this invention relates to a method and an apparatus for manufacturing electric motor stators that do not include a terminal board mounted to an end face thereof. The invention is intended primarily for use in the manufacture of 2-pole stators for dynamoelectric machines, such as motors, but may have application to the manufacture of other devices.

INCORPORATION BY REFERENCE

The disclosures of the following patents are hereby incorporated by reference herein.
1. U.S. Pat. No. 5,186,405 to Beakes et al.
2. U.S. Pat. No. 5,549,253 to Beakes et al.
3. U.S. Pat. No. 5,586,384 to Newman
4. U.S. Pat. No. 5,784,771 to Beakes et al.

BACKGROUND OF THE INVENTION

Many electric motor stators are configured to include a non-conductive terminal board mounted to an end face of the stator core, which terminal board carries electrically conductive terminals to which start and finish leads of the electric field coils wound onto the core are attached. Such stators are particularly suited for fully automated production because the electric field coils may be machine wound onto such stator cores and the start and finish leads of each coil may be at least temporarily secured to the terminal boards or terminals mounted thereon before the wound stator is removed from the winding machine for further processing. The coils will not unwind or despool upon removal of the stator from the winding machine because the finish leads are each secured to the terminal board or a terminal thereon. The start leads, as is well known, are each trapped by their respective coil turns in addition to being connected to the terminal board or terminals thereon.

In other stator configurations, no terminal board is mounted on the stator core. Thus, no terminal members are provided to which the coil leads can be connected before removal of the stator from the winding machine. "Boardless" stators have not been particularly suited for fully automated manufacturing because the coil leads, and in particular the finish leads, are not secured before the wound stators are removed from a winding machine. Therefore, the coils tend to despool after a wound stator is removed from the winding machine. To prevent such despooling, the current practice is to machine wind the coils and then manually to remove the wound stators from the winding machine. The worker who removes the wound stator secures the free finish leads by taping the finish leads to their respective coils. However, some despooling may still occur. Therefore, before securing the finish leads by tape, the worker must ensure that any coil turns that have despooled are reformed. As is evident, this procedure significantly increases the time needed to manufacture the stator.

The above-described despooling problem also arises in the manufacture of stators having terminal boards if the stators are manufactured by a process wherein the finish leads are not automatically connected to the terminal boards or the terminals thereon.

As to the documents incorporated by reference, Beakes et al. U.S. Pat. Nos. 5,186,405 and 5,549,253 show a turret stator winder including mechanisms useful in the practice of the instant invention. These include a stator winding head 92 with a shuttle or ram 94 and a programmably-operable lead pull assembly 208 that includes wire grippers 84. These also include pairs of winding forms 80 and 82, winding form retainer blades 130 and 132, and mechanisms included for moving the winding forms toward and away from the winding station. Of particular interest relative to the instant disclosure is assembly of parts for moving "the front pair of winding forms 80" described in U.S. Pat. No. 5,186,405 beginning at column 7, line 25 and in U.S. Pat. No. 5,549,253 beginning at column 6, line 1. To avoid unnecessary duplication of disclosure, parts of the machine of this invention which perform the same or essentially the same purpose as parts of the machine illustrated in the '405 and '253 patents are referred to in the accompanying drawings by the same reference numbers.

Reference numbers 300 and above are used herein to refer to parts for which there is no corresponding part in the '405 and '253 patents.

The present invention could be used with a turret stator winder as shown in the '405 and '253 patents. However, the invention is illustrated in connection with an in-line stator winder in which stators move along tracks to and from the winding station. Newman U.S. Pat. No. 5,586,384 is incorporated herein to show a representative in-line winder with which this invention could be used.

Both Beakes et al. '405 and '253 patents and the Newman '384 patent show stators which have terminal boards to which lead wires are at least temporarily connected at a robot lead connect station immediately following the winding of the stator. As disclosed therein, the lead wires are temporarily held by wire clips or clamps while the freshly-wound stators are transferred to a lead connect station. The aforementioned Beakes et al. '771 patent addresses the need to prevent stator coil finish wires from despooling after the winding operations are completed. The winding machine disclosed in the '771 patent includes a turret which delivers the freshly wound stators to a robot station at which the finish leads are tucked on the outside of the stator coils. While in transit from the winding station to the robot station, the coil lead wires are held by temporary wire clamps.

SUMMARY OF THE INVENTION

An object of this invention is to provide an improved method and an improved apparatus for winding stators, particularly those which do not have terminal boards. Another object is to provide such a method and an apparatus by which stator coil finish wires are sufficiently securely lodged between the stator core and the wound coil at the winding station to protect against despooling during subsequent handling of the stator and subsequent manufacturing operations performed thereon.

In accordance with this invention, a loop is formed in the finish lead and trapped between cooperating surfaces to frictionally resist the wire loop being pulled out by the wire gripper of a lead pull assembly. The wire gripper moves in directions to remove the loop and to wedge the stretch of the lead wire extending through the stator core between the coil and the core.

Other objects and advantages will become apparent in view of the following description and the accompanying drawings.

BRIEF DESCRIPTION OF THE DRAWINGS

FIG. 1 is a view and partly diagrammatic front perspective view, with parts shown in cross-section, of a stator winding station provided h an apparatus in accordance with this invention, and showing a nearly fully-wound stator at the winding station.

FIGS. 2 through 6 are similar views showing the sequence of steps taken to complete the winding of the stator shown partly wound in FIG. 1.

FIG. 7 is a fragmentary, side elevational view with parts in cross section, illustrating a further step taken to complete the winding of the stator shown in FIGS. 1 through 6.

FIG. 8 is a view similar to FIGS. 1 through 6 and indicating diagrammatically the path of the finish wire through the stator.

FIG. 9 is a highly simplified representation of the location of a stator coil finish wire often obtained with prior art winding practices.

FIG. 10 is similar to FIG. 9 but showing in simplified and idealized form the location of a coil finish wire that may routinely be obtained as a result of the practice of this invention.

DETAILED DESCRIPTION

FIG. 1 shows a stator 52 having a laminated core 54 being wound at a winding station of an in-line stator winding assembly which includes tracks 300 with guide plates 302 that confine the stators for movement along the tracks 300. Tracks 300 and plates 302 correspond to tracks 22 and 24 and guide plates 26 of said Newman U.S. Pat. No. 5,586,384. In the time during the winding cycle represented in FIG. 1, the wire guide needles 98 at the head of the winding shuttle or ram 94 are about to be extended through the bore of the stator 52 in order to complete the final coil turn.

In accordance with this invention, loop-forming cylinders 304 are mounted by brackets 306 to respective upper and lower form retainer blades 130 and 132, respectively. The loop-forming cylinders 304 have piston rods 308 to which are threaddedly connected vertically-oriented loop-forming pins 310 that are adapted to enter into the same holes in the winding forms 80 which are later engaged by the piston rods 140 of the carriage-mounted air cylinders 142 in order to effect removal of the winding forms 80. Both loop-forming pins 310 have reduced-diameter necks 312 for pulling loops in the finish turns as will become evident from the ensuing description.

Further in accordance with this invention, with reference to FIGS. 1 and 6, angled, spring steel plates 314 are affixed to each of the carriage-mounted air cylinders 142, the plates 314 including front panels 316 facing toward the winding station. The front panels 316 are self-biased away from the air cylinders 142 so that they can resiliently clamp wire loops 320 as discussed below and as shown in FIG. 7.

Here it may be noted that relative terms, such as vertically, upper, and lower are used in a relative and not an absolute sense herein.

Before the wire guide needles 98 have been extended through the stator bore to complete the last coil turns and have begun to retract through the stator bore, the loop-forming pins 310 are extended by operation of their respective air cylinders 304 so that, as shown in FIGS. 2 through 4, the finish wires, designated W, are looped over the pins 310 and extend into the necks 312. Thereafter, the pins 310 are retracted vertically away from the winding forms 80 to form loops 320 in the finish wires on the ends of the stator 52 opposite the winding head (not shown).

With reference to FIG. 6, as the pins 310 continue to move away from the winding forms 80, the loops 320 slip out of the necks 312 and off the ends of the pins 310. The carriage 144 is then moved toward the winding station causing the front panels 316 to engage the wire loops 320 and ultimately, as shown in FIG. 7, press them against the form retaining blades 130 and the track guide plates 302. The resilient panels 316 act as a wire tensioners, frictionally resisting removal of the wire loops so that the entire stretches of the finish wires from the loops to the wire grippers 84 are under tension. Accordingly, the path of the finish wire through the bore of the stator is highly predictable and repeatable.

After the parts have reached the position illustrated in FIG. 7, the wire grippers 84 engage the stretch of wire extending from the final turns of the wound coils and pulls the wire so that the loops 320 are eliminated, as shown in FIG. 8. (It will be noted that the operations to complete the lower stator coil are the same as those to complete the upper coil and are not illustrated in FIGS. 6 through 8.) Preferably, the wire grippers 84 pull radially outwardly as shown in FIG. 10 and also transversely across the face of the stator confronting the winding head. As a result, it is assured that the finish wire portion extending through the bore of the stator 52 will be on top of the radially outermost portion of the wound coil, designated C in FIG. 10. Tests have shown that the finish wire is wedged on top of the coil C at the location indicated by reference number 322 in FIG. 10 so that there is no opportunity for the finish wire to despool. Wedging of the finish wire of the bottom coil may not entirely occur, but because it lies under the last end turn (opposite the winding head) of the wound coil and because it is bent downwardly where it exits from the stator, it has no tendency to despool.

FIG. 9 shows a condition that is often obtained in the prior art, where it will be noted that the finish wire is located nearer the center of the stator, a condition that readily leads to despooling. Such a condition does not always occur in the prior art. Finish wires extend along various different paths due to the course surface of the wound coils. Use of the invention described herein controls the position of the finish wire to essentially that illustrated in FIG. 10.

Although the presently preferred embodiment of this invention has been described, it will be understood that within the purview of the invention various changes may be made within the scope of the following claims.

What is claimed is:

1. A method for winding stators with finish wires while the stator is located at a winding station, said method comprising:

winding an upper coil around pole-forming parts projecting into the bore of a stator core;

forming a loop in the finish wire extending from the coil, said loop extending above said upper coil;

trapping the loop between mutually-confronting members to frictionally resist removal of the loop; and while said loop is trapped between said members, pulling the finish wire to remove the loop and to wedge the stretch of the finish wire extending through the bore of the stator between the upper coil and the stator core.

2. The method of claim 1 wherein said loop is formed by moving a loop-forming pin into a position adjacent the stator core while the last turn of the coil is being wound and coursing the lead wire around the pin.

3. The method of claim 2 wherein the pin has a reduced-diameter neck in which a portion of the loop extends, and wherein said loop is trapped by steps comprising moving the pin upwardly to bend the loop upwardly between said members, releasing the loop from the pin, and relatively moving said members toward one another.

* * * * *